(12) United States Patent
Tokuyama et al.

(10) Patent No.: US 6,181,524 B1
(45) Date of Patent: Jan. 30, 2001

(54) MAGNETIC DISK APPARATUS WITH SLIDER AND SLIDER SUPPORTING MECHANISM INCLUDING FLEXIBLE SECTION INTEGRALLY FORMED FROM SAME MATERIAL

(75) Inventors: Mikio Tokuyama, Tsukuba; Kenji Mori, Tsuchiura; Hidekazu Kohira; Toshihiko Simizu, both of Ibaraki-ken; Hiromu Hirai, Tsukuba; Takao Terayama, Ushiku, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 08/533,450

(22) Filed: Sep. 25, 1995

Related U.S. Application Data

(63) Continuation of application No. 08/076,864, filed on Jun. 15, 1993, now abandoned.

(30) Foreign Application Priority Data

Jun. 17, 1992 (JP) .................................................. 4-157796

(51) Int. Cl.[7] .................................................. G11B 21/08
(52) U.S. Cl. .................................................. 360/245.5
(58) Field of Search .................................. 360/103–106, 360/97.01, 245.5

(56) References Cited

U.S. PATENT DOCUMENTS

| H1424 | * | 4/1995 | Budde | 360/104 |
| 4,001,889 | * | 1/1977 | Schneider | 360/97.01 |
| 4,245,267 | * | 1/1981 | Herman | 360/104 |
| 4,422,115 | * | 12/1983 | Spash | 360/104 |
| 5,041,932 | * | 8/1991 | Hamilton | 360/104 |
| 5,198,945 | * | 3/1993 | Blaeser et al. | 360/104 |
| 5,251,089 | * | 10/1993 | Hara | 360/121 |
| 5,282,102 | * | 1/1994 | Christianson | 360/104 |
| 5,335,126 | * | 8/1994 | Tokuyama et al. | 360/105 |
| 5,353,181 | * | 10/1994 | Frater et al. | 360/104 |

OTHER PUBLICATIONS

Japanese Patent Unexamined Publication No. 2–226512 Name: Tsukasama Tsuura, Date Sep. 1990.

* cited by examiner

Primary Examiner—David Davis
(74) Attorney, Agent, or Firm—Antonelli, Terry, Stout & Kraus, LLP

(57) ABSTRACT

A magnetic disk apparatus for recording information on and reproducing information from a magnetic disk with a magnetic head. A magnetic head supporting device includes a slider having the magnetic head mounted thereon, a flexible section supporting the slider, and a supporting section connected to the flexible section. The slider, the flexible section, and the supporting section are integrally formed from a same material. A rotary-type or linear-type positioning mechanism positions the magnetic head at a predetermined radial position of the magnetic disk.

28 Claims, 10 Drawing Sheets

MAGNETIC DISK APPARATUS WITH SLIDER AND SLIDER SUPPORTING MECHANISM INCLUDING FLEXIBLE SECTION INTEGRALLY FORMED FROM SAME MATERIAL

This is a continuation of application Ser. No. 08/076,864, filed on Jun. 15, 1993 now abandoned.

BACKGROUND OF THE INVENTION

1. Field of the Invention

The present invention relates to a magnetic disk apparatus and, more particularly, to a magnetic disk apparatus suitable for achieving a small size, a large capacity and high-speed access, and a magnetic head supporting device for use in such a magnetic disk apparatus.

2. Description of the Related Art

In recent years, it has been strongly demanded that a magnetic disk apparatus have a reduced size, an increased capacity and increased access speed while ensuring high reliability. In order to meet these demands, various proposals have been made. In particular, in order to reduce the size of a magnetic disk apparatus, the diameter of a magnetic disk has been decreased, and the spacing between stacked magnetic disks has been decreased. Among the most recent apparatuses for magnetic disks of 3.5 inches, those having a spacing of 3 mm between disks are being sold on the market. As the size of magnetic disk apparatuses has thus been reduced, the size of magnetic head supporting devices for such apparatuses has been rapidly reduced. An example of such size reduction is shown in Japanese Patent Unexamined Publication No. 2-226512. This publication discloses a method in which a slider having a magnetic head mounted thereon is directly formed on the surface of a suspension by a film forming process.

In the disclosed art, the slider and the suspension, are formed of different materials. It has been conventional that a suspension, which must have a spring structure for supporting a slider, is generally formed of a metal material while the slider, which is to contact a magnetic disk, is normally formed of an abrasion-resistant material.

As a result, in a construction wherein a slider is formed on a suspension by a film forming process, as in the above-described prior art, no consideration has been given to the bonding strength between the slider and the suspension (that is, the bonding strength between the different materials), thus involving the possibility that the slider may be separated by contacting the magnetic disk. Further, the slider may tend to be deformed due to factors such as a difference in coefficients of thermal expansion of the different materials for the slider and the suspension, thereby involving the risk of the slider flying characteristic being adversely influenced. In addition, since it is difficult in a currently practiced film forming process to achieve a surface roughness of not more than 10 nm while assuring that the flying surface of the slider is distant from the suspension by a certain slider thickness (height) required to mount the magnetic head, the slider cannot function sufficiently. Thus, it has been impossible to assure that the magnetic disk apparatus can provide high reliability.

SUMMARY OF THE INVENTION

An object of the present invention is to provide a magnetic disk apparatus capable of ensuring high reliability.

In one aspect of the present invention, there is provided a magnetic disk apparatus for recording information on and reproducing information from magnetic disks by means of magnetic heads, said apparatus comprising magnetic head supporting means which comprises a slider or sliders provided with said magnetic head or heads, a flexible section or sections supporting said slider or sliders, and a supporting section or sections; and drive means for driving said magnetic head supporting means; said slider or sliders, said flexible section or sections and said supporting section or sections being integrally formed from a same material.

In another aspect of the present invention, there is provided a magnetic disk apparatus for recording information on and reproducing information from magnetic disks by means of magnetic heads, said apparatus comprising magnetic head supporting means which comprises a supporting section or sections disposed to face the recording surfaces of said magnetic disks, a slider or sliders provided with said magnetic head or heads, a flexible section or sections supporting said slider or sliders; and drive means for driving said magnetic head supporting means; said slider or sliders, said flexible section or sections and said supporting section or sections being integrally formed from a same material.

In other aspect of the present invention, there is provided a magnetic head supporting device for magnetic disk apparatuses having magnetic heads for recording information on and reproducing information from magnetic disks, said device comprising a magnetic head supporting means comprising a slider or sliders provided with said magnetic head or heads, a flexible section or sections supporting said slider or sliders, and a supporting section connecting to said flexible section or sections, said slider or sliders, said flexible section or sections and said supporting section being integrally formed from a same material.

In a further aspect of the present invention, there is provided a magnetic head supporting device for magnetic disk apparatuses having magnetic heads for recording information on and reproducing information from magnetic disks, said device comprising a supporting section or sections provided to face the recording surfaces of said magnetic disks, a plurality of sliders provided on said supporting section or sections and provided with magnetic heads, and a plurality of flexible sections supporting each said slider, said sliders and said flexible sections being formed integral with said supporting section or sections.

Thus, a magnetic head supporting device can be integrally formed from a single thin plate, thereby making it possible to provide a small-sized magnetic head supporting device with a high level of precision. Accordingly, it is possible to assure high reliability of a magnetic disk apparatus.

DESCRIPTION OF THE PREFERRED EMBODIMENTS

A first embodiment of the present invention will be described with reference to FIGS. 1 through 6.

Figure 1:
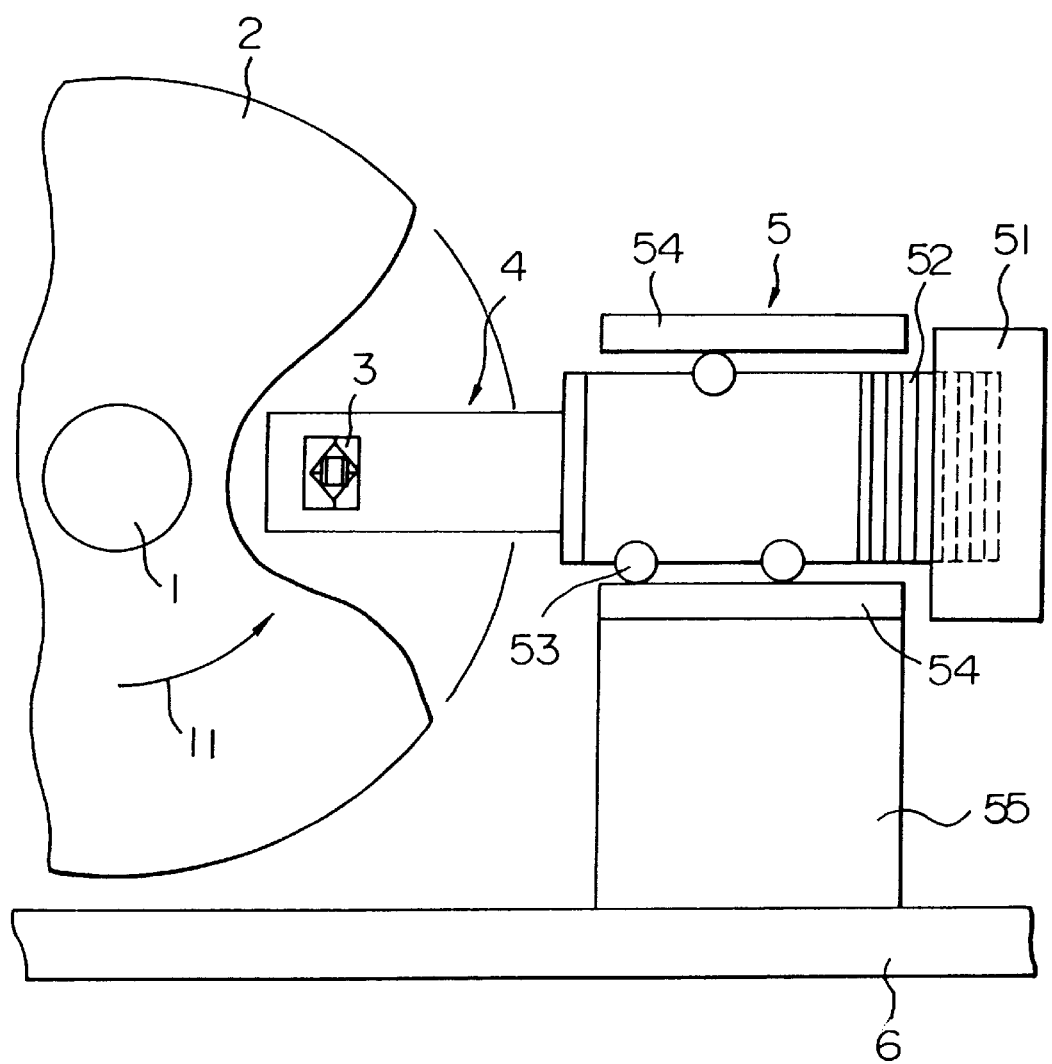
FIG. 1 is a plan view showing in a partial section a first embodiment of a magnetic disk apparatus according to the present invention.

FIG. 1 shows the construction of a first embodiment of a magnetic disk apparatus according to the present invention. Referring to FIG. 1, the apparatus has a spindle 1 on which a plurality of magnetic disks 2 for storing data are stacked. Magnetic disks 2 rotate in the direction indicated by the arrow 11. Sliders 3 of the apparatus, on which magnetic heads (not shown in FIG. 1) for writing and reading data are mounted, are inserted in the gap between two adjacent magnetic disks 2. Each slider 3 is supported by a slider supporting mechanism 4 of the apparatus. The slider supporting mechanism 4 is connected with a positioning mechanism 5 which serves for moving the magnetic head to and positioning the head at a specific radial position of a magnetic disk 2. The positioning mechanism 5 is of a type generally referred to as "a linear actuator type", and acts to position the magnetic head at a certain radial position by moving the magnetic head linearly in the radial direction of the magnetic disk 2. The positioning mechanism 5 comprises a voice coil motor (VCM) for generating a driving force, casters 53, and guide rails 54. The guide rails 54 are fixed to a base 6 of the apparatus by means of a positioning mechanism support 55. The voice coil motor comprises a magnet 51 and a coil 52. A positioning mechanism control means (not shown) feeds back an electrical signal from the magnetic head so as to control the electric current flowing in the coil 52 to thereby position the magnetic head at a predetermined radial position.

The slider 3 and the slider supporting mechanism 4 are formed integrally from a single thin plate, such as a single silicon (Si) wafer.

Figure 2:
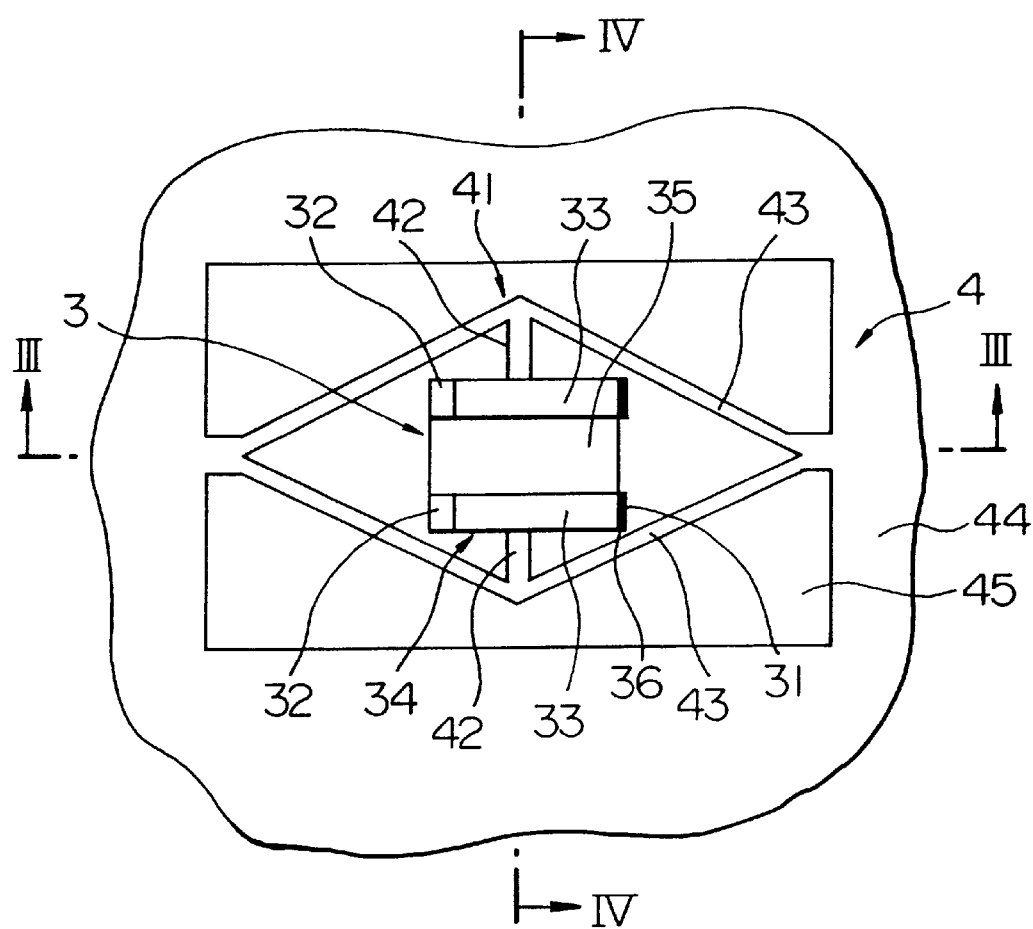
FIG. 2 is an enlarged, fragmentary plan view of a slider supporting mechanism which is used in the first embodiment shown in FIG. 1.

FIG. 2 shows the slider 3 and the associated portions on an enlarged scale. Referring to FIG. 2, the slider 3 comprises a pair of flying rails 34, each of which comprises a tapered portion 32 and a flat portion 33, and a bleeding portion 35. A magnetic head 31 is mounted on rear end faces of the flying rails 34. Although the illustrated example of the embodiment includes sliders of a taper-flat type as described above, any other configuration will do. That is, the number of flying rails, the shape of the flying surface of the flying rails, and the positions at which the magnetic heads are mounted are not specifically limited. In particular, the magnetic head need not be provided on the rear end faces of the flying rails 34, but may be provided, for example, on the flat portion 33 of the slider, or on a back surface 36 of the slider which is opposite the flying surfaces. A stepped or recessed portion may be provided instead of the tapered portion 32. The slider 3 is supported by gimbals 42 and 43, which together constitute a flexible section 41 of the slider supporting mechanism 4, and is connected to a rigid portion 44 of the mechanism 4. The slider 3, gimbals 42 and 43, and the rigid portion 44 are formed integrally from a same material to provide windows 45 therebetween. On the principles of a dynamic pressure air bearing, relative movement between a magnetic disk 2 and the slider 3 causes the flying rails 34 to increase a static pressure to thereby fly over the magnetic disk 2. The gimbals 42 and 43 which constitute the flexible section 41 permit motions of the slider flying surfaces in directions non-parallel thereto (upward and downward motion, pitching, and rolling) which have components perpendicular to the flying surface of the slider 3 (i.e., the surfaces of the flying rails 34), and suppress motions of the slider flying surfaces in directions parallel thereto (yawing) which are parallel with the flying surface of the slider 3.

Figure 3:
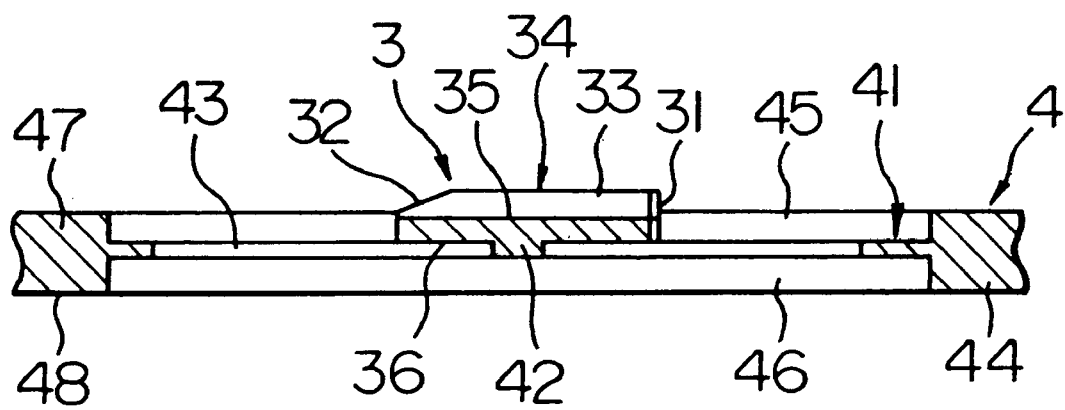
FIG. 3 is a sectional view of the slider supporting mechanism, taken along the line III—III shown in FIG. 2.

The construction of the slider 3 and the associated portions will be explained with reference to FIGS. 3 and 4. Referring to FIG. 3, as described above, the slider 3 is supported by the gimbals 42 and 43 which constitute the flexible section, and is thus connected to the rigid portion 44, the above elements being formed integrally from a same material. The flying rails 34 of the slider 3 are formed to project above an upper surface 47 of the rigid portion 44. The bleeding portion 35 of the slider 3 is formed to be stepped from the tapered portions 32 and the flat portions 33 of the flying rails 34 toward the back surface 36 of the slider 3. The gimbals 42 are formed on the back surface 36 of the slider 3 to be contiguous to the slider 3, and are connected to the rigid portion 44 by the gimbals 43 which are formed integrally from the same material. The slider supporting mechanism 4 is provided with a through window which is divided by the gimbals 42 and 43 into a pair of windows, that is, the upper window 45 and a lower window 46.

Figure 4:
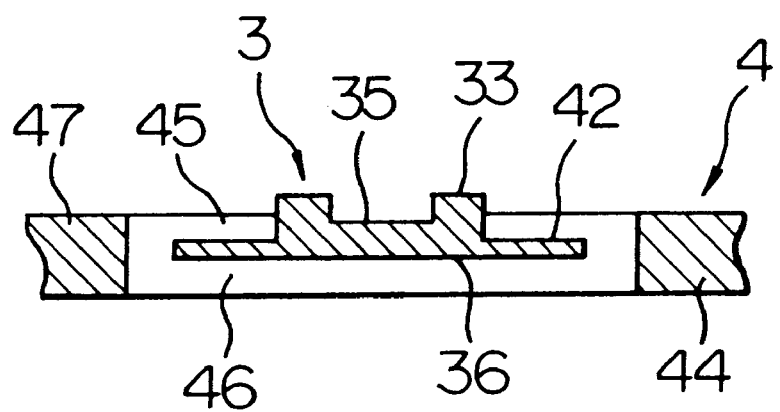
FIG. 4 is a sectional view of the slider supporting mechanism, taken along the line IV—IV shown in FIG. 2.

It will be seen from FIG. 4 that the flying surfaces of the slider 3 project above the upper surface 47 of the rigid portion 44, and the back surface 36 of the slider 3 is formed to be contiguous to the gimbals 42.

The method of forming the slider 3 and the slider supporting mechanism 4, described above in detail with reference to FIGS. 2 and 4, will be briefly described, and the advantages of the first embodiment of the present invention will be described.

The slider 3 and the slider supporting mechanism 4 of the first embodiment are formed integrally from a single Si wafer by using an ion milling method which is a kind of etching process. In an ion milling method, processing (etching) is effected by projecting ion atoms (or ion molecules) onto a surface to be processed, and a coating referred to as "a resist" is formed on a surface area that need not be processed so as to prevent unwanted etching. A resist can be formed on a surface easily and highly precisely by using lithography which is widely employed in LSI fabrication, etc. Such a resist, whose shape is not limited, can be formed to have any desired shape. In addition, it is widely known from VLSI processing, etc., that a combination of a plurality of resists makes it possible to perform three-dimensional processing. Such an etching process provides a high precision such that controlling a period of time required for etching, temperatures, gas components in the atmosphere, electric voltages, etc., makes it possible to achieve a working precision on the order of microns ($\mu$m).

The use of the above etching process makes it possible to reduce the size of the slider 3 and the slider supporting mechanism 4 with a high precision on the order of microns ($\mu$m).

Specifically, a conventional small-size slider has a length of 3 mm, a width of 2.4 mm and a height of 0.64 mm. A slider of this size is generally referred to as a micro slider. The flying rails of such a conventional slider have a width of 0.2 to 0.5 mm, and have a working precision on the order of several tens of microns ($\mu$m) due to the use of machine working. In fact, this precision level has been the upper limit that machine working can attain. On the other hand, there have been strong demands for reduction in the size of a slider and the size of a slider supporting mechanism such that further reduction in the size of sliders is indispensable. Specifically, it is important to develop very small sliders referred to as "nano-sliders" (having a full length of approximately 2 mm) or "pico-sliders" (having a full length of approximately 1 mm). In order to produce pico-sliders, working of high precision on the order of microns ($\mu$m) or smaller must be done to provide the necessary rail width. It is considered impossible to produce such a very small slider with machine working.

The rigidity of the flexible section has to be reduced as the size of the slider is reduced. A gimbal thickness of a micro slider is about 40 $\mu$m. In the case of a pico-slider, it is thought essential that such thickness be below 20 $\mu$m. Such reduction in the thickness of gimbals causes a remarkable decrease of productivity and impossibility of mass production due to deformation and difficult handling of gimbals during assembly when a slider is composed of separate parts and is assembled with a suspension.

As described above, when gimbals have a high rigidity, they may hinder free motions of a slider, thereby making it impossible for the slider to follow undulatory motion or vibrations of a magnetic disk, and hence to perform stable flying. If gimbals and a slider are formed as separate members, they have different coefficients of thermal expansion, thereby involving the risk that when the temperature changes, the flying surfaces of the slider may change to cause fluctuations in the flying height.

Positioning precision with respect to a slider and gimbals, which is believed to greatly influence the flying posture and flying characteristics of the slider, is about plus or minus 50 $\mu$m in the case of micro-sliders while it is believed in the case of pico-sliders to be higher to the extent of not more than plus or minus 20 $\mu$m.

The above-described problems can be overcome by forming the slider 3 and the slider supporting mechanism 4 integrally by an etching process or the like from a same material as in the first embodiment of the invention. That is, forming the slider 3 and the slider supporting mechanism 4 integrally from a same material makes possible highly precise working employing etching or the like, making it possible to reduce the size of the slider 3 and the thickness of the gimbals 43, and to unite the gimbals with the slider 3 at high precision. Further, the size of the entire slider supporting mechanism 4 can be reduced. The slider 3 can be free from deformation due to a difference in a coefficient of thermal expansion which would be caused in the case of forming the slider and the gimbals of different materials. Since an assembly process and tools are unnecessary, productivity can be improved.

In the first embodiment, the slider, the gimbals and the rigid portion have shapes suitable for being formed from a same material by an etching process. Specifically, as shown in FIG. 2, the slider, the gimbals and the rigid portions are shaped such that their projections do not overlap one another when they are projected in a direction perpendicular to the flat portions 33 of the flying rails 34 of the slider 3. More specifically, when the slider 3 is projected in a direction perpendicular to the flat portion 33 of the flying rails 34, the projection of the slider 3 does not overlap the projection of the rigid portion 44. Similarly, when the gimbals 42 and 43 are projected in the above direction, the projections of the gimbals 42 and 43 do not overlap the projection of the rigid portion 44. In fact, as seen from FIGS. 3 and 4, when projected in a direction perpendicular to the flat portions 33 of the flying rails 34, the projection of the slider 3 does not overlap with the projections of the gimbals 42 and 43 and the rigid portion 44, and when projected in that direction, the projections of the gimbals 42 and 43 do not overlap with the projection of the rigid portion 44.

The above-described configuration of a head supporting structure (which comprises the slider and the slider supporting mechanism) makes it possible to form the slider, the gimbals and the rigid portion integrally from a same material by an etching process using lithography. The illustrated configuration of the head supporting structure of this embodiment is exemplary, and is not limitative. That is, it is sufficient to form the slider and the slider supporting mechanism suffice in such a manner that the respective projections of the slider, the gimbals and the rigid portion do not overlap one another when projected in a direction perpendicular to the flat portions of the flying rails. Formation of the slider supporting mechanism (comprising the slider, the gimbals and the rigid portion) integrally from a Si wafer by an etching process eliminates damage (such as cracks) and mechanical deformation which would be caused by machine working and assembly, and eliminates any change in composition, thereby making it possible with a Si material to realize as great a mechanical strength as that obtainable with normal metal materials. Specifically, it is possible to achieve a Young's modulus E of approximately 170 GP (in a (1, 0, 0) crystal structure). Thus, it is possible to form the gimbals and the rigid portion from a Si material in contrast with the conventional practice in which these portions have been formed of a metal material (a stainless steel material). The use of Si in forming the slider and the slider supporting mechanism is advantageous in that a signal line for conveying signals from the magnetic head and/or an amplification circuit for such signals can be directly formed on the slider supporting mechanism, thereby improving productivity. Although the first embodiment employs a Si wafer, the slider and the slider supporting mechanism may be formed from ordinary ceramic materials by an etching process.

When the size of the slider is reduced, this is advantageous in that fluctuations in the flying height with respect to the magnetic disk 2 undergoing undulations or vibrations are reduced, thereby making it possible to achieve stable and low flying. Stable flying enables improvement in reliability, and low flying enables increases in recording density. Reduction in the size of the slider leads to reduced weight of the slider, which in turn makes it possible to achieve high-speed access and high-precision positioning. Reduction in the size of the slider is also advantageous in that the size of the magnetic disk apparatus can be reduced in such a manner as to increase the capacity of the apparatus.

Another advantage of slider size reduction is that even when the slider 3 contacts a magnetic disk 2, the impact at the time of contact can be reduced, thereby assuring high reliability.

Figure 5:
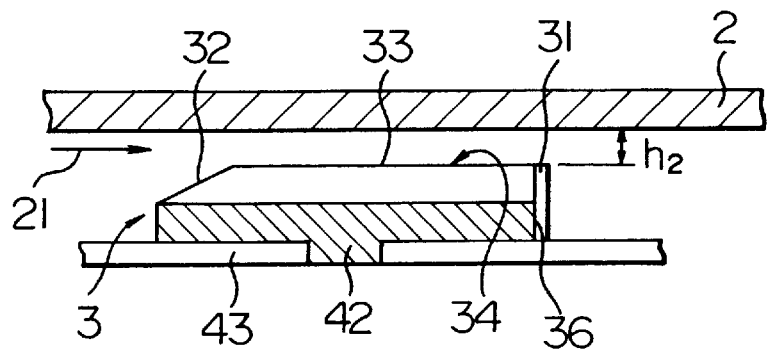
FIG. 5 is a sectional view showing the slider supporting mechanism of FIG. 1 in operation.
Figure 6:
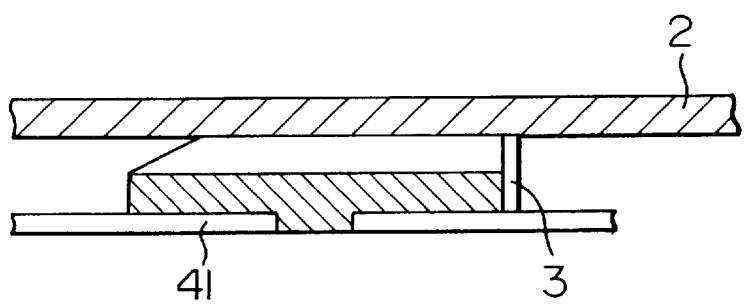
FIG. 6 is a sectional view showing the slider supporting mechanism of FIG. 1 at rest.

The slider 3 of the first embodiment of a magnetic apparatus according to the present invention is used in the manner shown in FIGS. 5 and 6. Referring to FIG. 5, when the magnetic disk 2 rotates in the direction indicated by arrow 21 to reach a predetermined number of revolutions per unit time, the tapered portions 32 and the flat portions 33 of the flying rails 34 of the slider 3 act on the principles of a dynamic pressure air bearing to form a very thin air film (to increase a static pressure above the ambient pressure) to thereby fly over the rotating magnetic disk 2. The magnetic head 31 is mounted on the rear end faces of the flying rails 34 in such a manner as to be flush with the flat portions 33. The distance h2 between the magnetic head 31 and the rotating magnetic disk 2 is generally referred to as the flying height. The flying height has decreased as the recording density has increased. Some of the magnetic disk apparatuses most recently developed have a flying height of approximately 0.1 mm. In order to decrease the flying height with increases in the recording density, the slider 3 has been becoming smaller and smaller. The first embodiment of the present invention enables realizing a further reduction in the size of the slider 3, thereby enabling a smaller flying height, and hence, an improved recording density. As shown in FIG. 6, when the magnetic disk 2 is at rest, the slider contacts the magnetic disk 2. This type of operating the slider 3 is referred to as "a contact start/stop (abbreviated to "CSS") type operation". While in the the first embodiment the head supporting structure employs a CSS type operation, the slider 3 need not be operated in a CSS manner. In this regard, the head supporting structure may be provided with a load/unload mechanism for causing the slider to fly in close proximity to the disk when the disk attains a predetermined number of revolutions per unit time while the apparatus is operating, and for causing the slider to separate from the disk when the number of revolutions of the disk is reduced to a predetermined number while the apparatus is stopping.

Figure 7:
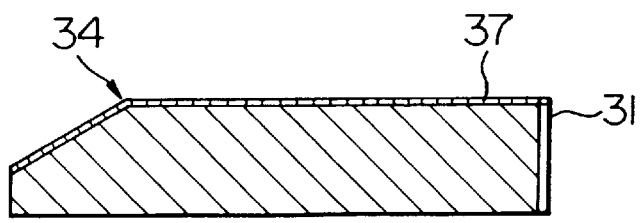
FIG. 7 is a sectional view of a slider which is used in the first embodiment shown in FIG. 1.

As shown in FIG. 7, the flying rails 34 of the slider 3 are coated with a silicone dioxide ($SiO_2$) film 37 serving as a protective film of the slider 3. By virtue of this coating, even when the slider 3 is brought into intermittent contact with a magnetic disk 2 while the magnetic disk apparatus is operating, the flying surface of the slider 3 is prevented from being worn, and hence, from causing changes in the flying characteristic of the slider 3, which changes would result in the slider 3 continually contacting a magnetic disk 2, thereby damaging to damage data stored thereon. Thus, it is possible to improve reliability.

While the first embodiment uses a Si material which has a good workability and is not inferior to metal materials in mechanical properties, materials having an excellent abrasion-resistant property such as SiC; $SiO_2$; $Si_2N_4$; $Al_2O_3TiC$; $Al_2O_3TiO_2$; $ZrO_2$; Fe-MnZn and the like may be used.

An abrasion-resistant property may be improved by suitably changing the property of the flying surface of the slider by implanting or sputtering ions of nitrogen, carbon, etc.

While the first embodiment provides a slider supporting mechanism which allows the slider to fly above a magnetic disk during the rotation of the disk, the slider supporting mechanism may be the type which allows the slider to contact a rotating disk to effect contact recording. Further, the disk may be a floppy disk having flexibility.

Figure 8:
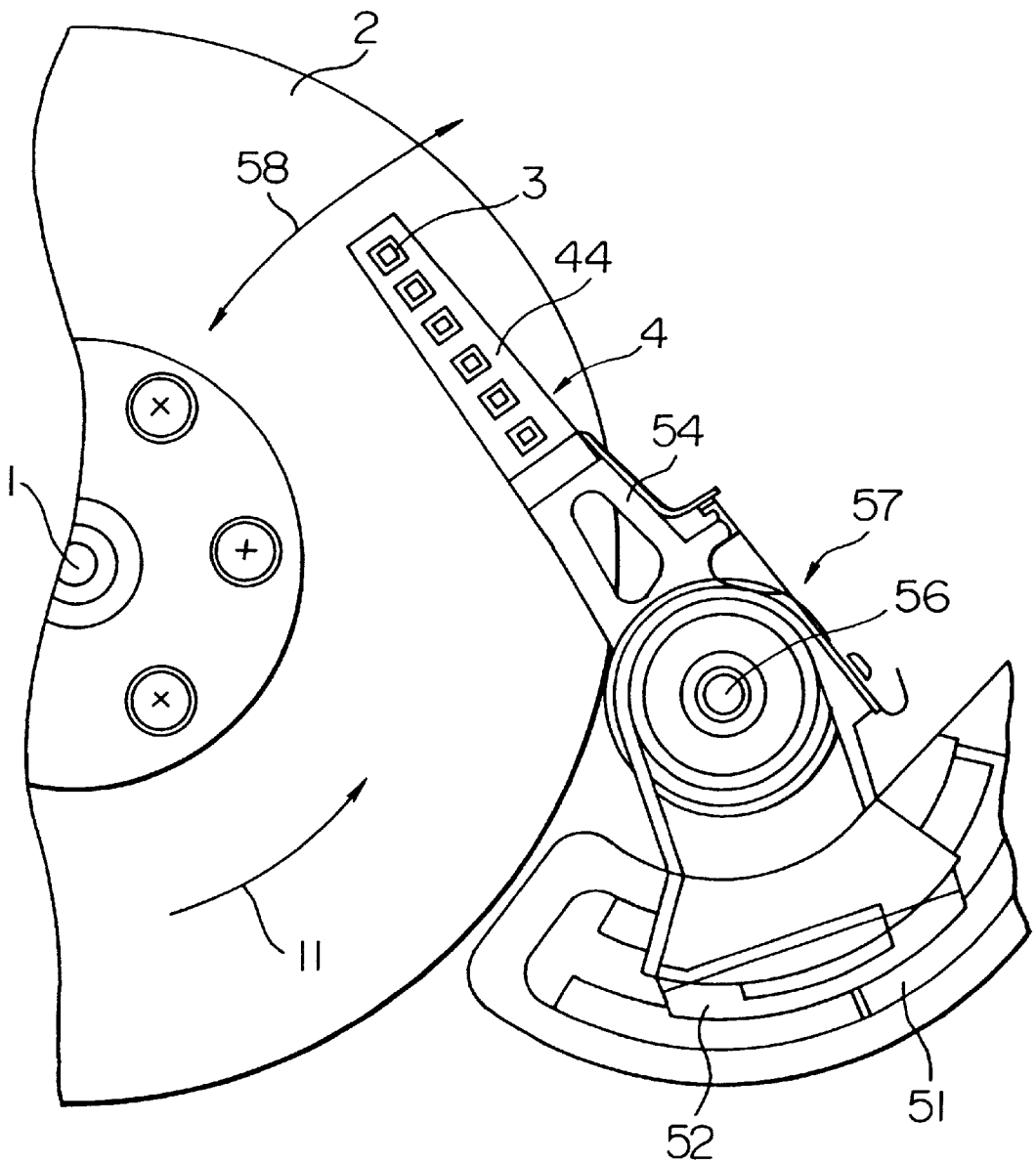
FIG. 8 is a plan view of a second embodiment of a magnetic disk apparatus according to the present invention.

A second embodiment of a magnetic disk apparatus according to the present invention will be described with reference to FIG. 8. In the second embodiment, a plurality of sliders 3 and a slider supporting mechanism 4 are formed integrally from a same material. The slider supporting mechanism 4 is connected with a guide arm 54 of a positioning mechanism 57 of a rotary type. Each slider 3 is joined to a rigid portion 44 by flexible portions (gimbals) in a manner similar to that in the first embodiment, and descriptions of this construction will be omitted. The rotary-type positioning mechanism 57 is driven by a magnet 51 and a coil 52 of a voice coil motor to rotate about an axis of rotation 56 to thereby turn the sliders 3 in either direction indicated by arrow 58 so as to position a magnetic head (not shown) at a predetermined radial position. A magnetic disk 2 rotates in a direction indicated by arrow 11 from the voice coil motor toward the sliders 3. The second embodiment provides the plurality of sliders 3 so that the access time is shortened; in addition, the use of the rotary-type positioning mechanism 57 contributes to reducing the size of the entire magnetic disk apparatus. Similarly to the first embodiment, the sliders 3 and the slider supporting mechanism 4 of the second embodiment are formed integrally from a same material to provide substantially the same advantages as the first embodiment, that is, high precision and reduced size of the sliders 3 and the slider supporting mechanism 4, thus providing a small-size and large-capacity magnetic disk apparatus which is capable of high-speed access and highly reliable. It is feasible to use a slider, a flying height of which is substantially the same at all the radial positions of a disk (from the inner periphery to the outer periphery of the disk), so as to optimize the electrical characteristics of magnetic heads mounted on each slider. More specifically, so-called negative sliders may be used which realize a predetermined flying amount independent of the peripheral speed of the disks by utilizing a relative moving speed (peripheral speed) between them and the disks to produce and use a lower static pressure than the ambient pressure.

Figure 9:
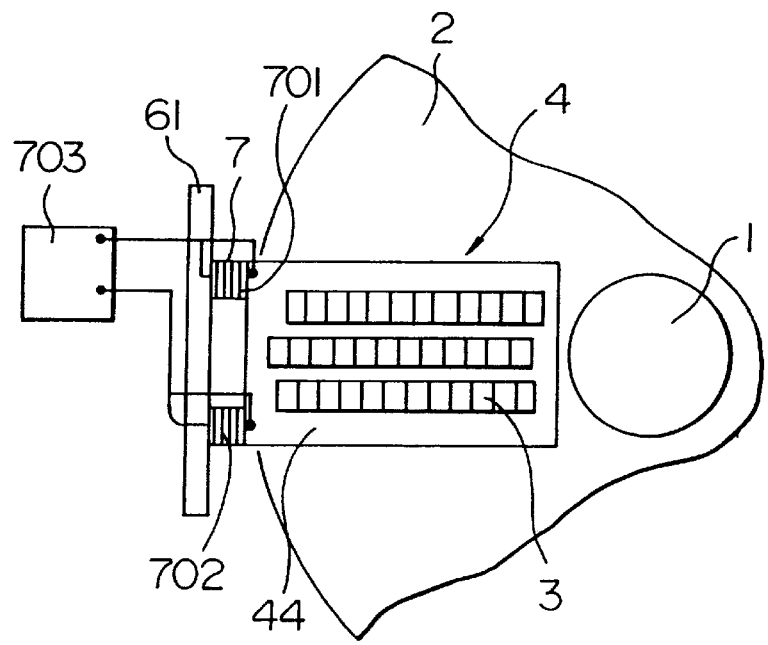
FIG. 9 is a plan view of a third embodiment of a magnetic disk apparatus according to the present invention.

A third embodiment of an apparatus of the present invention will be described with reference to FIG. 9. This embodiment has a feature in that a plurality of sliders 3, on which a plurality of magnetic head elements of a magnetic head are mounted, are provided, and that a positioning mechanism comprises a plurality of stacked piezoelectric elements 7 disposed between a stationary wall 61 and a rigid portion 44 of a slider supporting mechanism 4. The sliders 3 are joined to the rigid portion 44 of the slider supporting mechanism 4 in a manner similar to that in the first embodiment, and descriptions of this construction will be omitted. As shown in FIG. 9, the sliders 3 are arranged in three rows in such a manner that the sliders 3 are slightly displaced from one another in the radial direction of a magnetic disk 2. With this arrangement, the access distance that has to be covered during data accessing can be reduced in inverse proportion to the number of sliders 3 to enable greatly shortening the access time. A magnetic head can be positioned at a predetermined radial position with a high precision on the order of submicrons (1 μm or less) and at high speeds within 1 ms or less by the use of the stacked piezoelectric elements 7.

The third embodiment comprises the stacked piezoelectric elements 7 including a first or upper piezoelectric unit 701 and a second or lower piezoelectric unit 702, and a control means 703 for independently controlling the displacement of the piezoelectric units 701 and 702. Thus the angle (generally referred to as "the azimuth angle") between an associated magnetic head and magnetic recording tracks concentrically provided on the surface of a magnetic disk 2 can be adjusted to enable each of the magnetic head elements to read and write data at an azimuth angle of 0° at which a reading signal from the magnetic head element has the maximum output level. Thus, it is possible to read and write data with high reliability, thereby realizing a highly reliable magnetic disk apparatus.

Also in the third embodiment, the sliders 3 and the slider supporting mechanism 4 are formed integrally from a same material, thereby making it possible to provide advantages similar to those provided by the first embodiment.

Figure 10:
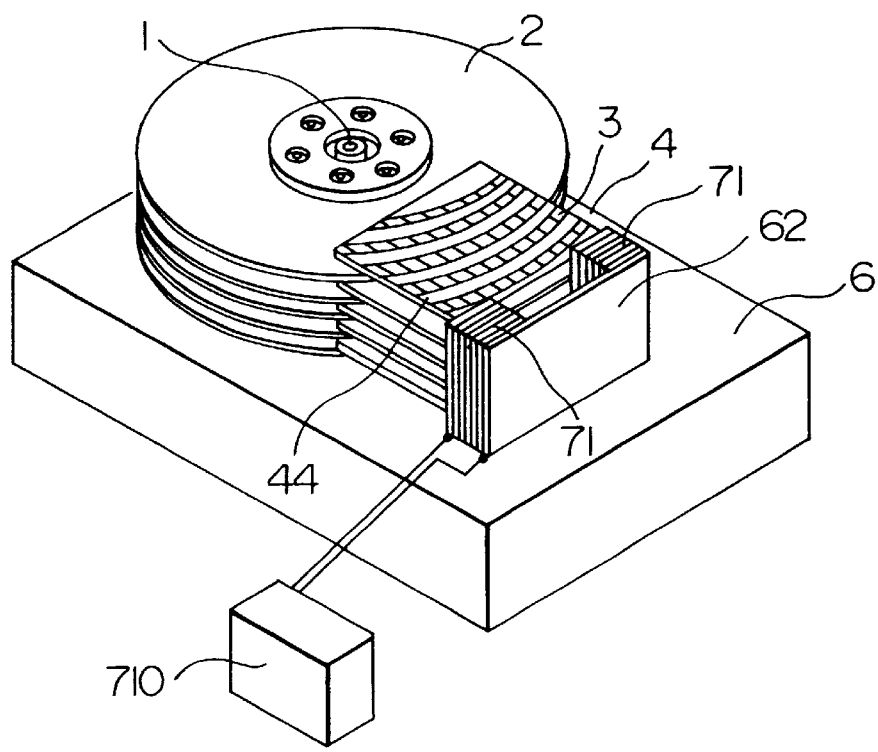
FIG. 10 is a perspective view of a fourth embodiment of a magnetic disk apparatus according to the present invention.
Figure 11:
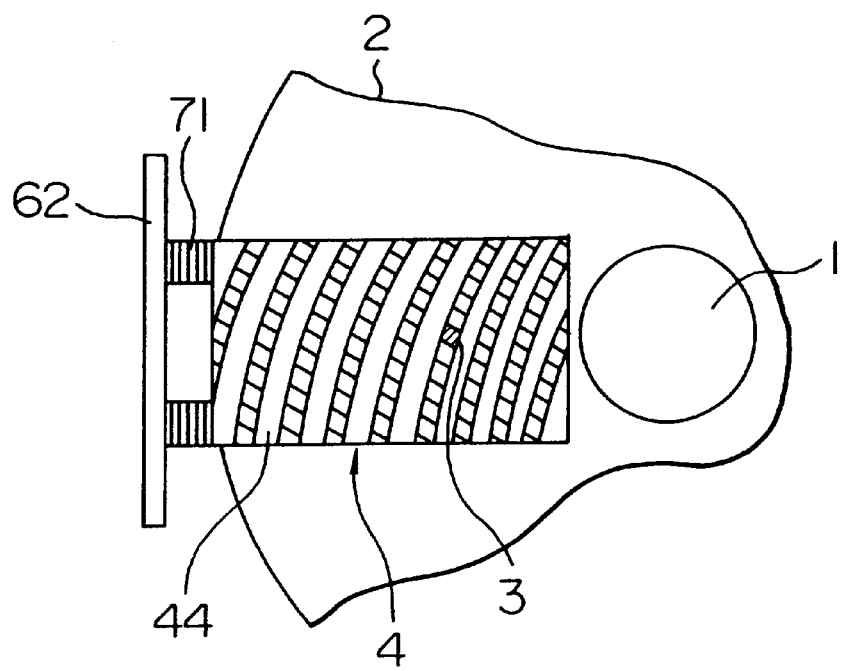
FIG. 11 is a plan view of the fourth embodiment shown in FIG. 10.
Figure 12:
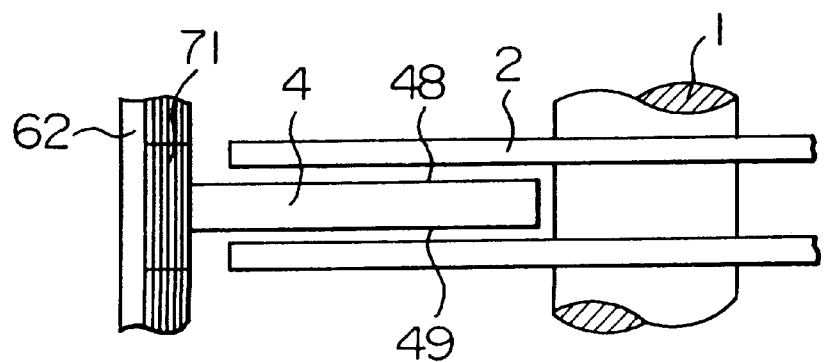
FIG. 12 is a front view of the fourth embodiment shown in FIG. 10.

A fourth embodiment of an apparatus of the present invention will be described with reference to FIGS. 10, 11 and 12. The fourth embodiment is distinguished from the third embodiment in that, as shown in FIGS. 10 and 11, a plurality of sliders 3 are spirally disposed on a slider supporting mechanism 4, and that, as shown in FIGS. 10 and 12, the slider supporting mechanism 4 comprises a plurality of slider supporting mechanism sections, each of which is disposed between two adjacent ones of a plurality of stacked magnetic disks 2. The spiral arrangement of the sliders 3 on the slider supporting mechanism 4 enables reducing the azimuth angle between the magnetic head mounted on the sliders 3 and magnetic information recorded on the surface of a magnetic disk 2, thereby obtaining an increased output from the magnetic head, and hence a good magnetic recording characteristic. Interposition of each section of the slider supporting mechanism 4 between two adjacent ones of stacked magnetic disks 2 enables a large number of magnetic disks 2 to be stacked, and enables a small-sized magnetic disk apparatus of a prescribed size to have an increased number of disks loaded in a space limited by the prescribed size (referred to as "the form factor"), thus achieving a relatively large capacity for the apparatus.

As shown in FIG. 12, each section of the slider supporting mechanism 4 is interposed between two adjacent magnetic disks 2, and sliders 3 are provided on upper and lower (as viewed in FIG. 12) surfaces 48 and 49 of each slider supporting mechanism section so that data can be read from and written on a magnetic disk 2 facing the upper surface 48 and another magnetic disk 2 facing the lower surface 49.

With the above arrangement, a single slider supporting mechanism section enables performing simultaneous data reading/writing with respect to the respective upper and lower surfaces of successive stacked magnetic disks to narrow a spacing between stacked magnetic disks, thereby making it possible to accordingly reduce the size of the apparatus or increase the storage capacity thereof. Like the third embodiment, the fourth embodiment provides a plurality of sliders 3, and a positioning mechanism having piezoelectric elements 71 fixed to a base 6 of the apparatus through a stationary wall 62, thus obtaining advantages similar to those of the third embodiment, that is, high-speed high-precision data access, and high-reliability magnetic recording by virtue of suitable adjustment of the azimuth angle. In the fourth embodiment, the plurality of slider supporting mechanism sections 4 are driven and positioned by the pair of stacked piezoelectric units, but an independent piezoelectric unit may be provided for each section of the slider supporting mechanism 4 so that the respective slider supporting mechanism sections can be controlled independently of one another.

Figure 13:
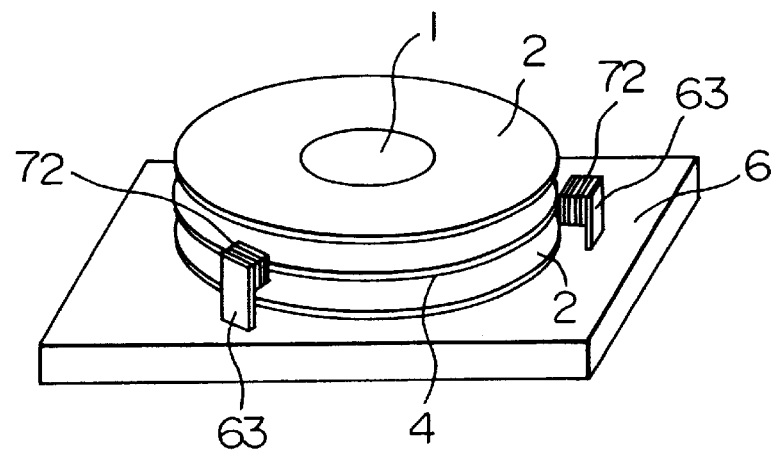
FIG. 13 is a perspective view of a fifth embodiment of a magnetic disk apparatus according to the present invention.
Figure 14:
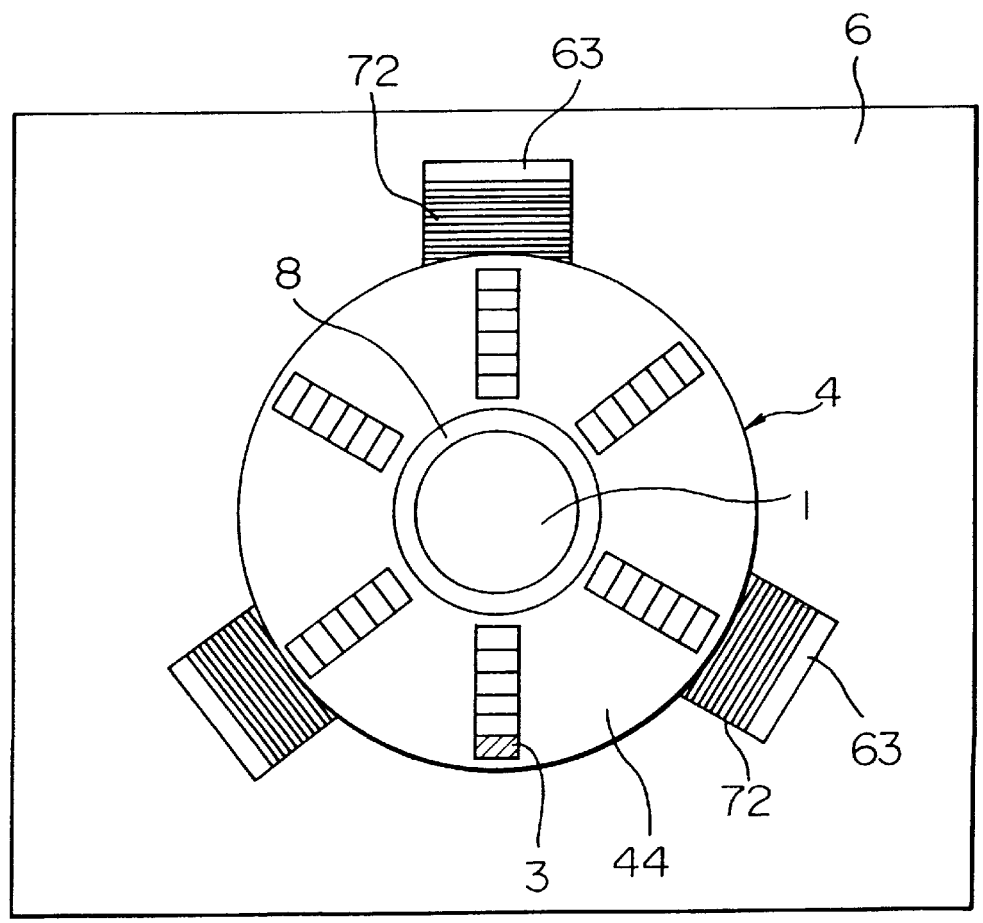
FIG. 14 is a plan view of the fifth embodiment shown in FIG. 13.

A fifth embodiment of an apparatus of the present invention will be described with reference to FIGS. 13 and 14. In the fifth embodiment, as shown in FIG. 13, a slider supporting mechanism 4 is interposed between two magnetic disks 2, and is provided on its side surface with a positioning mechanism which comprises stacked piezoelectric elements 72. The piezoelectric elements 72 are fixed to a base 6 of the apparatus through stationary walls 63. The two magnetic disks 2 are secured to a spindle 1 of the apparatus to rotate at substantially the same rotational speed as the spindle 1. The slider supporting mechanism 4, fixed through the stationary walls 63, is not rotatable. The slider supporting mechanism 4 comprises a Si wafer having substantially the same diameter as the magnetic disks 2. A circular hole 8 of an inner diameter greater than the outer diameter of the spindle 1 is formed in the center of the wafer so that the slider supporting mechanism 4 is not rotated by the rotation of the spindle 1. Six rows of sliders 3, on which a magnetic head comprising a plurality of magnetic head elements is mounted, are provided on the slider supporting mechanism 4.

Each row of sliders consists of six sliders, and so thirty-six sliders in total are concentrically arranged on the slider supporting mechanism 4. Although not shown, another thirty-six sliders are similarly arranged on the lower surface of the slider supporting mechanisms 4.

Thus, in the fifth embodiment, the plurality of sliders 3 and the slider supporting mechanism 4 are formed integrally on the single Si wafer in such a manner that the wafer per se is used as a head supporting structure, thereby improving productivity. With the radial arrangement of the rows of sliders 3, it is possible to shorten a waiting time for the revolution of the magnetic disks, which amounts to a greater part of access time. Also, in the present embodiment, the use of three piezoelectric elements for the mechanism of positioning the sliders enables positioning all the sliders 3 at predetermined positions on the magnetic disk surfaces with high precision and at high speeds. Accordingly, the same result as that of the third embodiment can be obtained in the fifth embodiment.

Figure 15:
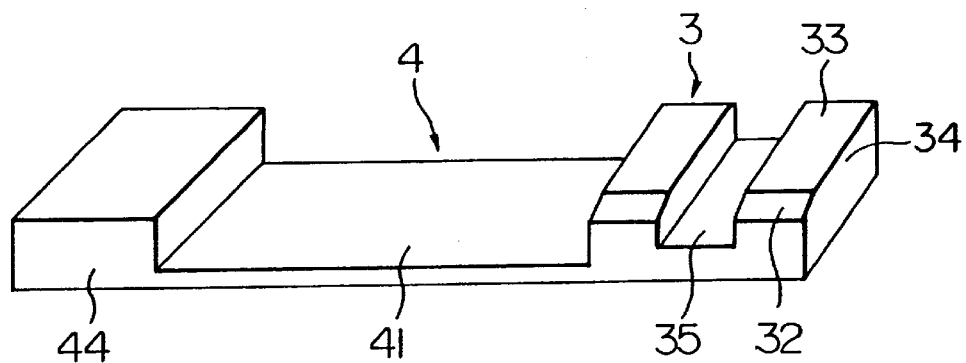
FIG. 15 is a perspective view of another embodiment of a slider supporting mechanism which is used in a magnetic disk apparatus according to the present invention.

Another form of a slider and a slider supporting mechanism in an apparatus according to the present invention will be described with reference to FIGS. 15 and 16. In this embodiment, as shown in FIG. 15, a slider 3 is supported by a thin plate-shaped flexible section 41 of a slider supporting mechanism 4. The flexible section 41 is connected to a rigid portion 44 of the mechanism 4. The rigid portion 44 is adapted to be connected to a positioning mechanism (not shown) of the apparatus. The configuration of the slider 3 in this embodiment is substantially the same as that in the first embodiment: the slider 3 comprises a pair of flying rails 34, each having a tapered portion 32 and a flat portion 33, and a bleeding portion 35 between the rails 34.

Figure 16:
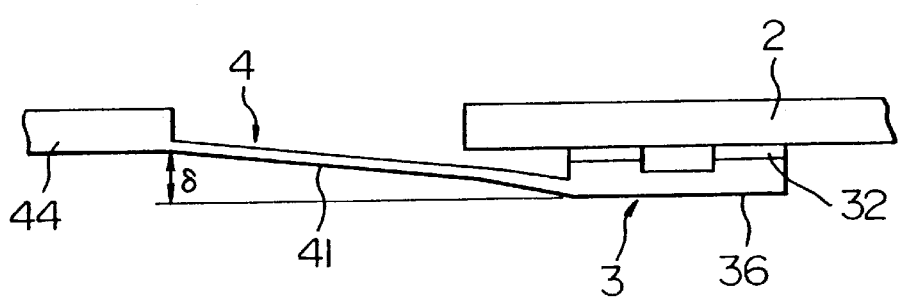
FIG. 16 is a side view of the slider supporting mechanism shown in FIG. 15, illustrating the operation of the mechanism.

When the slider 3 and the slider supporting mechanism 4 are mounted in a magnetic disk apparatus, the slider 3 contacts a magnetic disk 2 as shown in FIG. 16, so that the flexible section 41 is flexed to exert on the slider 3 a pressing load w equivalent to the product of the resilience k of the flexible section 41 and the amount of flection $\delta$.

In this embodiment, a desired pressing load w can be obtained by suitably adjusting the resilience k and the amount of flection $\delta$. Since the pressing load w and the flying height are inversely proportional to each other, the flying height can be adjusted by means of the load w. Moreover, it is important that even when the disk 2 undergoes relatively great undulations or vertical vibrations, the resilience of the flexible section 41 enables the slider 3 to adequately follow the movement of the magnetic disk 2, thereby achieving stable flying, and hence the provision of a highly reliable magnetic disk apparatus. Since the slider 3 and the slider supporting mechanism 4 are formed integrally from a same material, the above embodiment is able to provide advantages similar to those of the first embodiment.

Figure 17:
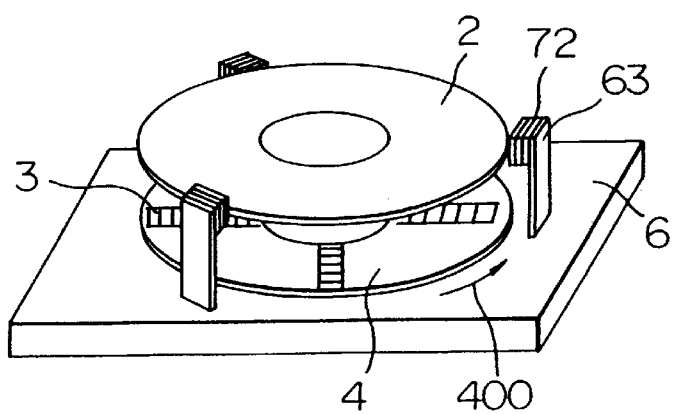
FIG. 17 is a perspective view of a sixth embodiment of a magnetic disk apparatus according to the present invention.

A sixth embodiment of an apparatus according to the present invention will be described with reference to FIG. 17. In the sixth embodiment, a magnetic disk 2 is supported by three piezoelectric elements 72, which are in turn fixed to a base 6 of the apparatus through stationary walls 63. Thus, the magnetic disk 2 is fixed to the stationary walls 63 and is not rotatable. A slider supporting mechanism 4 is secured to the spindle of the apparatus so as to be rotatable at the same rotational speed as the spindle in the direction indicated by an arrow 400 in FIG. 17. The slider supporting mechanism 4 is formed from a Si wafer of substantially the same diameter as the magnetic disk 2, and a plurality of sliders 3 are arranged in radial rows on the surface of the wafer.

Thus, a plurality of sliders 3 and a slider supporting mechanism 4 are formed integrally on a single Si wafer in such a manner that the wafer per se is used as a head supporting structure, thereby improving productivity. With the radial arrangement of the rows of sliders 3, it is possible to shorten a waiting time for the revolution of the magnetic disk, which amounts to a greater part of an access time. Also, in the present embodiment, the use of three piezoelectric elements for the mechanism of positioning the sliders enables positioning all the sliders 3 with high precision and at a high speed. Accordingly, the same result as that of the fifth embodiment can be obtained in the sixth embodiment. Furthermore, since the magnetic disk need not be fixed to the spindle, the magnetic disk can be replaced easily to realize a disk-replacement type magnetic disk apparatus.

Figure 18:
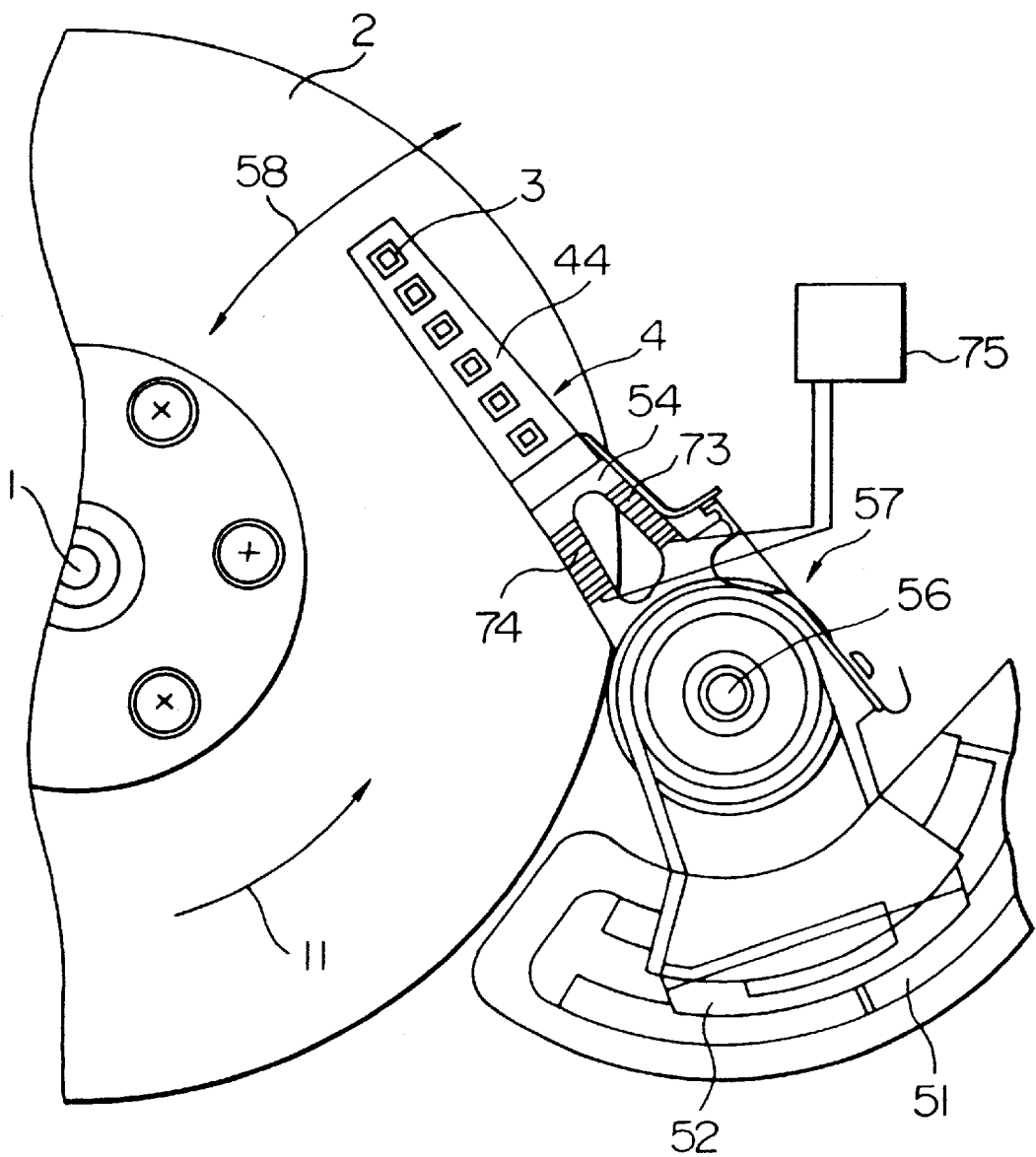
FIG. 18 is a plan view of the relevant portions of a seventh embodiment of a magnetic disk apparatus according to the present invention.

A seventh embodiment of an apparatus according to the present invention will be described with reference to FIG. 18. The seventh embodiment has a feature in that two stacked piezoelectric elements, that is, upper and lower piezoelectric elements 73 and 74, and a control means 75 for controlling the piezoelectric elements 73 and 74 are provided on a guide arm 54 of a rotary-type positioning mechanism 57. With this construction, the amounts of displacement of the pair of piezoelectric elements 73 and 74 can be adjusted to suitably adjust the azimuth angle, as in the above third embodiment. Thus, the rotary-type positioning mechanism 57 is able to achieve an azimuth angle of 0°, thereby enabling realizing highly reliable magnetic recording. Further, the seventh embodiment provides advantages similar to those provided by the above second embodiment.

Thus, according to the present invention, a slider and a slider supporting mechanism are integrally formed from a same material, thereby enabling reducing the size of the slider and the slider supporting mechanism with high precision. Accordingly, the slider is capable of stable and low flying, thereby enabling ensuring improved recording density, high-speed access, and high reliability, and also increasing the capacity of the apparatus.

What is claimed is:

1. A magnetic disk apparatus for recording information on and reproducing information from magnetic disks with magnetic head means, the apparatus comprising:
   magnetic head supporting means including
      a slider or sliders having the magnetic head means mounted thereon, each slider including at least one rail,
      a flexible section or sections supporting the slider or sliders, each flexible section including at least one flexible member connected to a respective slider and extending substantially perpendicular to the at least one rail of the respective slider, and
      a supporting section or sections connected to the flexible section or sections,
      the slider or sliders, the flexible section or sections, and the supporting section or sections being integrally formed from a same material; and
   linear drive means for positioning the magnetic head means at a predetermined radial position or positions of the magnetic disks;
   wherein each flexible section includes two first flexible members respectively connected to two sides of the respective slider, the two first flexible members each extending substantially perpendicular to the at least one rail of the respective slider, and two second flexible members respectively connecting the two first flexible members to one supporting section;
   wherein the two first flexible members are respectively connected to two opposite sides of the respective slider;
   wherein a first end of each of the two first flexible members is connected to a respective one of the two opposite sides of the respective slider;
   wherein a second end of each of the first flexible members is connected to a point between a first end of a respective one of the two second flexible members and a second end of the respective one of the two second flexible members;
   wherein the first end of each of the two second flexible members is connected to the one supporting section at a portion of the one supporting section opposing an air inlet end of the respective slider; and
   wherein the second end of each of the two second flexible members is connected to the one supporting section at a portion of the one supporting section opposing an air outlet end of the respective slider.

2. An apparatus according to claim 1, wherein the sliders and the flexible sections are disposed on the supporting section or sections in a linear manner.

3. An apparatus according to claim 1, wherein the sliders and the flexible sections are disposed on the supporting section or sections in a spiral manner.

4. An apparatus according to claim 1, further comprising a drive mechanism provided between the drive means and the magnetic head supporting means, the drive mechanism including two piezoelectric elements.

5. An apparatus according to claim 1, wherein each slider is adapted to fly above a recording surface of one of the magnetic disks due to relative movement between the slider and the one magnetic disk.

6. An apparatus according to claim 1, wherein each flexible section is formed from a thin plate made of Si or a Si compound.

7. An apparatus according to claim 1, wherein each flexible section is formed from a thin plate made of a ceramic compound including a main component of Al, Ti, or Zr, or a ceramic compound including Fe to which Mn and Zn are added.

8. A magnetic disk apparatus for recording information on and reproducing information from magnetic disks with magnetic head means, the apparatus comprising:
   magnetic head supporting means including
      a slider or sliders having the magnetic head means mounted thereon, each slider including at least one rail,
      a flexible section or sections supporting the slider or sliders, each flexible section including at least one flexible member connected to a respective slider and extending substantially perpendicular to the at least one rail of the respective slider, and a supporting section or sections connected to the flexible section or sections, the slider or sliders, the flexible section or sections, and the supporting section or sections being integrally formed from a same material; and linear drive means for positioning the magnetic head means at a predetermined radial position or positions of the magnetic disks;

wherein each flexible section includes two first flexible members respectively connected to two sides of the respective slider, the two first flexible members each extending substantially perpendicular to the at least one rail of the respective slider, and two second flexible members respectively connecting the two first flexible members to one supporting section;

wherein the slider is adapted to fly above a recording surface of one of the magnetic disks due to relative movement between the slider and the one magnetic disk;

wherein the two first flexible members are respectively connected to two opposite sides of the respective slider;

wherein a first end of each of the two first flexible members is connected to a respective one of the two opposite sides of the respective slider;

wherein a second end of each of the first flexible members is connected to a point between a first end of a respective one of the two second flexible members and a second end of the respective one of the two second flexible members;

wherein the first end of each of the two second flexible members is connected to the one supporting section at a portion of the one supporting section opposing an air inlet end of the respective slider; and wherein the second end of each of the two second flexible members is connected to the one supporting section at a portion of the one supporting section opposing an air outlet end of the respective slider.

9. A magnetic disk apparatus for recording information on and reproducing information from magnetic disks by means of magnetic heads, said apparatus comprising:

magnetic head supporting means including a slider or sliders provided with said magnetic head or heads, each slider including at least one rail, a flexible section or sections supporting said slider or sliders, each flexible section including at least one flexible member connected to a respective slider and extending substantially perpendicular to said at least one rail of said respective slider, and a supporting section or sections; and drive means for driving said magnetic head supporting means;

wherein said slider or sliders, said flexible section or sections, and said supporting section or sections are integrally formed from a same material;

wherein each flexible section includes two first flexible members respectively connected to two opposite sides of said respective slider, said two first flexible members each extending substantially perpendicular to said at least one rail of said respective slider, and two second flexible members respectively connecting said two first flexible members to one supporting section;

wherein a first end of each of the two first flexible members is connected to a respective one of the two opposite sides of the respective slider;

wherein a second end of each of the first flexible members is connected to a point between a first end of a respective one of the two second flexible members and a second end of the respective one of the two second flexible members;

wherein the first end of each of the two second flexible members is connected to the one supporting section at a portion of the one supporting section opposing an air inlet end of the respective slider; and wherein the second end of each of the two second flexible members is connected to the one supporting section at a portion of the one supporting section opposing an air outlet end of the respective slider.

10. An apparatus according to claim 9, wherein said magnetic head supporting means is formed from a thin plate made of Si or a Si compound.

11. An apparatus according to claim 10, wherein said drive means includes a linear drive device.

12. An apparatus according to claim 11, wherein each slider is adapted to fly above a recording surface of one of said magnetic disks due to relative movement between said slider and said one magnetic disk.

13. An apparatus according to claim 10, wherein each slider is adapted to fly above a recording surface of one of said magnetic disks due to relative movement between said slider and said one magnetic disk.

14. An apparatus according to claim 10, wherein said magnetic head supporting means is formed from a thin plate made of one ceramic compound selected from a group consisting of a ceramic compound mainly containing Al and Ti, a ceramic compound mainly containing Zr, and a ceramic compound containing Fe to which Mn and Zn are added.

15. An apparatus according to claim 14, wherein said drive means includes a linear drive device.

16. An apparatus according to claim 15, wherein each slider is adapted to fly above a recording surface of one of said magnetic disks due to relative movement between said slider and said one magnetic disk.

17. An apparatus according to claim 16, wherein each slider is adapted to fly above a recording surface of one of said magnetic disks due to relative movement between said slider and said one magnetic disk.

18. A magnetic disk apparatus for recording information on and reproducing information from magnetic disks with magnetic head means, the apparatus comprising:

magnetic head supporting means including a slider or sliders having the magnetic head means mounted thereon, each slider including at least one rail, a flexible section or sections supporting the slider or sliders, each flexible section including at least one flexible member connected to a respective slider and extending substantially perpendicular to the at least one rail of the respective slider, and a supporting section or sections connected to the flexible section or sections, the slider or sliders, the flexible section or sections, and the supporting section or sections being integrally formed from a same material;

wherein each flexible section includes two first flexible members respectively connected to two sides of the respective slider, the two first flexible members each extending substantially perpendicular to the at least one rail of the respective slider, and two second flexible members respectively connecting the two first flexible members to one supporting section;

wherein the two first flexible members are respectively connected to two opposite sides of the respective slider;

wherein a first end of each of the two first flexible members is connected to a respective one of the two opposite sides of the respective slider;

wherein a second end of each of the first flexible members is connected to a Point between a first end of a respective one of the two second flexible members and a second end of the respective one of the two second flexible members;

wherein the first end of each of the two second flexible members is connected to the one supporting section at a portion of the one supporting section opposing an air inlet end of the respective slider; and wherein the second end of each of the two second flexible members is connected to the one supporting section at a portion of the one supporting section opposing an air outlet end of the respective slider.

19. An apparatus according to claim 18, further comprising drive means for driving the magnetic head supporting means or the magnetic disks to establish a desired positional relationship between the magnetic head means and the magnetic disks;

wherein in the desired positional relationship, the magnetic head means is positioned at a predetermined radial position or positions of the magnetic disks.

20. An apparatus according to claim 19, wherein the drive means includes a linear positioning mechanism for driving the magnetic head supporting means to position the magnetic head means at the predetermined radial position or positions of the magnetic disks.

21. An apparatus according to claim 19, wherein the drive means includes a rotary positioning mechanism for driving the magnetic head supporting means to position the magnetic head means at the predetermined radial position or positions of the magnetic disks.

22. An apparatus according to claim 19, wherein the drive means drives the magnetic head supporting means to position the magnetic head means at the predetermined radial position or positions of the magnetic disks; and wherein the drive means includes two piezoelectric elements.

23. An apparatus according to claim 19, further comprising means for rotating the magnetic head supporting means;

wherein the drive means drives the magnetic disks to establish the desired positional relationship between the magnetic head means and the magnetic disks.

24. An apparatus according to claim 18, wherein the sliders and the flexible sections are disposed on the supporting section or sections in a linear manner.

25. An apparatus according to claim 18, wherein the sliders and the flexible sections are disposed on the supporting section or sections in a spiral manner.

26. An apparatus according to claim 18, wherein each slider is adapted to fly above a recording surface of one of the magnetic disks due to relative movement between the slider and the one magnetic disk.

27. An apparatus according to claim 18, wherein each flexible section is formed from a thin plate made of Si or a Si compound.

28. An apparatus according to claim 18, wherein each flexible section is formed from a thin plate made of a ceramic compound including a main component of Al, Ti, or Zr, or a ceramic compound including Fe to which Mn and Zn are added.

* * * * *